United States Patent
Smith et al.

(10) Patent No.: US 6,721,778 B1
(45) Date of Patent: Apr. 13, 2004

(54) UNSCHEDULED EVENT TASK PROCESSING SYSTEM

(75) Inventors: B. Scott Smith, Londonderry, NH (US); George R. Melillo, Townsend, MA (US); Mark Jennings, Brookline, NH (US)

(73) Assignee: Concerto Services, Inc., Westford, MA (US)

( * ) Notice: Subject to any disclaimer, the term of this patent is extended or adjusted under 35 U.S.C. 154(b) by 0 days.

(21) Appl. No.: 09/304,765

(22) Filed: May 4, 1999

Related U.S. Application Data

(60) Division of application No. 08/635,028, filed on Apr. 19, 1996, now Pat. No. 6,141,412, which is a continuation-in-part of application No. 08/252,121, filed on Jun. 1, 1994.

(51) Int. Cl.[7] .......................... G06F 9/00; G06F 15/16; H04M 3/00
(52) U.S. Cl. ...................... 709/103; 709/100; 709/102; 709/201; 379/265.01; 379/265.02
(58) Field of Search ................................ 709/100, 102, 709/103; 379/900, 265.01, 265.02, 266.7

(56) References Cited

U.S. PATENT DOCUMENTS

| 5,343,518 | A | * | 8/1994 | Kneipp ..................... 379/355.1 |
| 5,481,707 | A | * | 1/1996 | Murphy et al. ............. 709/102 |
| 5,546,455 | A | * | 8/1996 | Joyce et al. ........... 379/265.03 |
| 5,640,563 | A | * | 6/1997 | Carmon ...................... 709/102 |
| 6,141,412 | A | * | 10/2000 | Smith et al. ........... 379/265.14 |

\* cited by examiner

*Primary Examiner*—David Wiley
*Assistant Examiner*—Joseph E. Avellino
(74) *Attorney, Agent, or Firm*—Bourque & Associates, P.A.

(57) ABSTRACT

A task processing system such as a telephony call center and telephony call center management system downloads and processes unscheduled events such as inbound and outbound call records, in real time. A real time event server such as a real time call record server receives unscheduled events such as call records from an external record source, and places them in a real time call record table. The outbound campaign manager requests call records, and processes the real time call records in the same manner as other call records. A method for processing such real time events includes scheduling an ordered list of tasks, and commencing processing. When an unexpected event occurs, a predetermined task is selected in response to the event. The predetermined task is then integrated into the ordered list of scheduled tasks and processed.

14 Claims, 5 Drawing Sheets

UNSCHEDULED EVENT TASK PROCESSING SYSTEM

CONTINUATION DATA

This application is a divisional application of U.S. patent application Ser. No. 08/635,028 filed on Apr. 19, 1996 now U.S. Pat. No. 6,141,412 which is a continuation-in-part of U.S. patent application Ser. No. 08/252,121, filed on Jun. 1, 1994.

FIELD OF THE INVENTION

This invention relates to the processing of unscheduled events by a data processing system and more particularly, to a telephone call center management system which can download and process call lists and call records in real time.

BACKGROUND OF THE INVENTION

Telephony call centers which place outbound calls and receive inbound calls typically utilize a telephone call center management system to help automate much of the process. Agents with headsets and terminals converse with calling and called parties, while automatic phone dialers dial phone numbers and route connected calls to the agents. The telephone call center management system controls, among other functions, the dialing of outbound telephone numbers from a predefined, sorted customer call list having a number of customer call records within each customer call list. These customer call lists are usually downloaded from a call record source, such as a host computer, to the telephony call center management system only once during a twenty-four hour period, often during the non-busy early hours of the morning. Individual records from the customer call list[s] are then grouped and processed during the day as call campaigns. A call campaign comprises a collection of group customer call records generally having one or more common attributes. A telephony call center can generally run several call campaigns simultaneously.

A typical use of a telephony call center is to initiate a call campaign to contact a predefined group or segment of customers or potential customers that have a common attribute such as credit card accounts with payments overdue by 60 days. The user can instruct a record source, such as a host computer containing a credit card account database, to sort through that database and select the overdue credit card accounts. The host computer then downloads the overdue credit card account records as one or more call lists to the telephone call center management system. This is often referred to as batch processing.

The telephone call center management system then processes the call list as a call campaign by automatically dialing customer credit card account telephone numbers included within the call record, and connecting answered calls to agents. The agents can then converse with the called parties and attempt to reconcile the overdue accounts. Agents record the results of the reconciliation on agent terminals. At the end of the day, the customer call list with the results of the phone calls are uploaded back to the host computer database for storage and future reference.

This batch processing approach does not allow for any dynamic changes that can occur to the customer call lists during the day. In the prior art systems, the call lists are downloaded from the source such as a host computer, the call lists cannot be changed. Any updates to the call record source will not be included until the next download. For example, if a customer payment arrives for their account and the call record is modified to reflect the payment, it is not possible to update the running call list so that customer is not called that day. The customer is called anyway, potentially creating poor relations with the customer, and a waste of time for the agent and the telephony call center.

Telephony call centers which process incoming calls exacerbates this problem. The purpose of the incoming calls can not always be anticipated. For example, if a caller simply wants to check on an account balance, the handling agent can usually call up the account balance to the agent terminal while the customer is on the line. But there are many incoming calls that can not be handled without calling the person back. For example, a customer may call and want to talk to a specific agent. If the requested agent is busy, the call may be unconnectable, or the caller must wait on hold for an indefinite period.

Another choice would be to call the customer back when the preferred agent is available. In present telephony call center management systems, the agent handling the call must manually inform the preferred agent to call the customer back. This defeats the purpose of having automatic phone dialers and pacers. There is a need for a telephone call center management system to be able to schedule a callback to automatically dial and connect the preferred agent to the customer when the preferred agent is available.

Another example is a telephony call center for handling an emergency "911" calls for a community. 911 numbers are meant to be used for emergency calls requesting immediate assistance. But in practice, a majority of the calls are not for emergency situations. These non-emergency calls range from requests for information, to complaints, to lonely individuals wanting to talk to someone. Emergency dispatch personnel must rate the importance of a deluge of incoming calls, and handle the true emergency calls immediately.

One method of handling non-emergency calls is to get the caller's name, number, and problem, and have secondary support personnel call them back and help with their problem. While 911 numbers are staffed 24 hours a day, secondary support personnel may not be available 24 hours a day. These support personnel may work only day shifts, or they may need to research an answer to a caller's request. In either case, it may be several hours before a support personnel can return the call.

When support personnel do call back, they must manually dial the phone number and wait to reach the person. This is an inefficient use of support personnel. A telephone call center management system to help automate this process would be very helpful. Emergency dispatch personnel could enter the non-emergency call information on their agent workstation or transfer the call to a voice response unit which will record the caller's telephone number for a call back. The system would then queue the call records so when a support personnel (agent) becomes available to handle calls, (even if it is many hours later) the telephone call center management system would automatically dial the caller, and if the call was answered, connect the person to a support personnel.

A telephone call center management system to solve these problems must be able to download updated call records on a real time basis. Batch processing of call lists alone will not work.

Accordingly, what is needed is a telephone call center management system which can continuously download and update call records, call lists and call record information on a real time basis.

SUMMARY OF THE INVENTION

The present invention provides a system and method for handling unscheduled events that require a change in a predetermined ordered list of scheduled tasks. An ordered list of scheduled tasks is produced, and processing of the tasks commences. When an unscheduled event occurs, the event is detected, and a predetermined task is selected in response to the event. The predetermined task is integrated into the ordered list of scheduled tasks to allow the predetermined task for the unscheduled event to be performed along with the ordered list of scheduled tasks.

This invention can be used in any task processing system, including a telephony call center, to allow real-time call record updating and processing. In a telephone call center management system, a telephony resource server is coupled to an outbound campaign manager which is responsive to a call table manager. The outbound campaign manager controls at least outbound call activities of the telephony resource server. A call record feed server is also coupled to the outbound campaign manager, and to at least one call record table, for retrieving call records from the call record table and for providing retrieved call records to the outbound campaign manager. A real-time call record server is coupled to the call table manager, and is responsive to a source of real-time call records to be handled. The real-time call record server receives the call records and places them in at least one call table.

To obtain and process call records, the outbound campaign manager can respond to notification by the call record feed server that at least one call record is in a call table. Alternatively, the outbound campaign manager can request call records using some other initiative, such as periodic time intervals.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
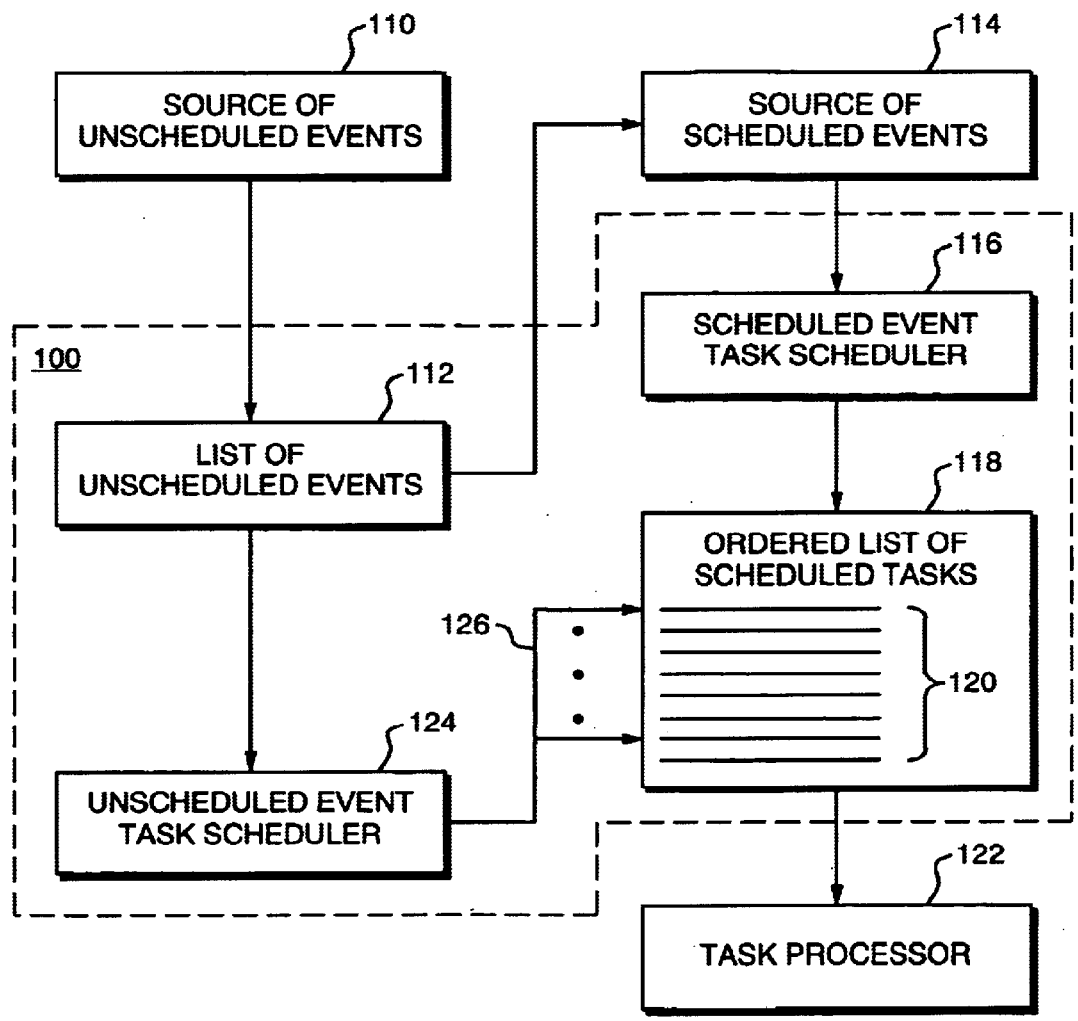
FIG. 1 is a schematic block diagram of the system of the present invention.

A task processing system 100, FIG. 1, according to the present invention is coupled to a source of unscheduled events 110 such as a computer system or other similar data processing system, which provides the unscheduled events needing be processed as tasks. Unscheduled events can be of any type that would require a predetermined task to be performed in response to the event(s). An example of unscheduled events includes call records in a telephone call center management system that require processing by contacting parties by telephone to obtain a response from all parties.

The source of unscheduled events 110 provides a list of unscheduled events 112 which are processed in the order received, unless a specific processing time is specified. The processed unscheduled are then ordered into an ordered list of scheduled events to be handled by the task processor 122. The events can be scheduled by any means including when the events occurred, a specific time for the event to be scheduled, or based on a priority system based on a predetermined criterion for prioritizing such events.

For example, in a telephone call center management system, an event priority can depend on the importance of reaching the called party within a given time period, with a low priority indicating a low importance of reaching the called party, while a high priority indicates a greater importance of reaching the called party in a shorter period of time.

The list of unscheduled events 112 may, in one embodiment, be ordered by the source of scheduled events 114 which is typically a computer or other data processing system providing processed and ordered lists of events to be handled by the task processor. Additionally, the source of unscheduled events 110 may also be the source of scheduled events 114.

Once the list of unscheduled events 112 are ordered, a scheduled event task scheduler 116 selects and/or generates tasks to perform in response to the events. The result of this selection is an ordered list of scheduled tasks 120. These tasks are performed in the order in which they are arranged in the ordered list of scheduled tasks 120. The scheduled tasks are then performed sequentially by a task processing system 122. In one example, the task processor can be an outbound telephone dialing system, for dialing the call records an the ordered list of scheduled call records (120) to dial.

As task processing system 122 is processing the tasks in the ordered list of scheduled tasks 120, new unscheduled events can be provided from the source of unscheduled events 110. These events form a new list of unscheduled events 112 that have not been scheduled into the ordered list of scheduled tasks 120. Nonetheless, these unscheduled events signal that appropriate tasks need to be initiated and processed. Therefore, one or more tasks which are responsive to these new unscheduled events must be integrated into the ordered list of scheduled tasks 120.

Unscheduled event task scheduler 124 performs this operation by selecting one or more predetermined tasks to be performed in response to each unscheduled event, and integrates the new predetermined task into the ordered list of scheduled tasks 120, as generally shown by arrow 126. The position in which unscheduled event tasks scheduler 124 inserts the new task into the ordered list of scheduled tasks 120 will depend upon the predetermined prioritizing method, for example the method used for scheduling the tasks scheduled in the event task scheduler 116 although a different priority scheme may be used.

Once the new tasks are scheduled in the ordered list of scheduled tasks 120, the ordered list will continue to be processed in order by task processor 122. Task processor system 122 generally does not need to be aware of any changes to the ordered list of scheduled tasks 120 that occur due to the scheduling of new tasks.

Unscheduled event task scheduler 124 can insert tasks in response to unscheduled events as they occur, given that when one event "trickles down" from the source of unscheduled events 110, a new task is inserted into the ordered list of scheduled tasks 120. Alternatively, unscheduled event task scheduler 124 can insert tasks only after a predetermined number of unscheduled events occur (batch processing), or based on a timing criterion (unscheduled events are processed only at certain times which may be dictated by and contained in the unscheduled event itself) in which case unscheduled event task scheduler 124 is not responsive to the occurrence of a new event, but to some other external stimulus.

Figure 2:
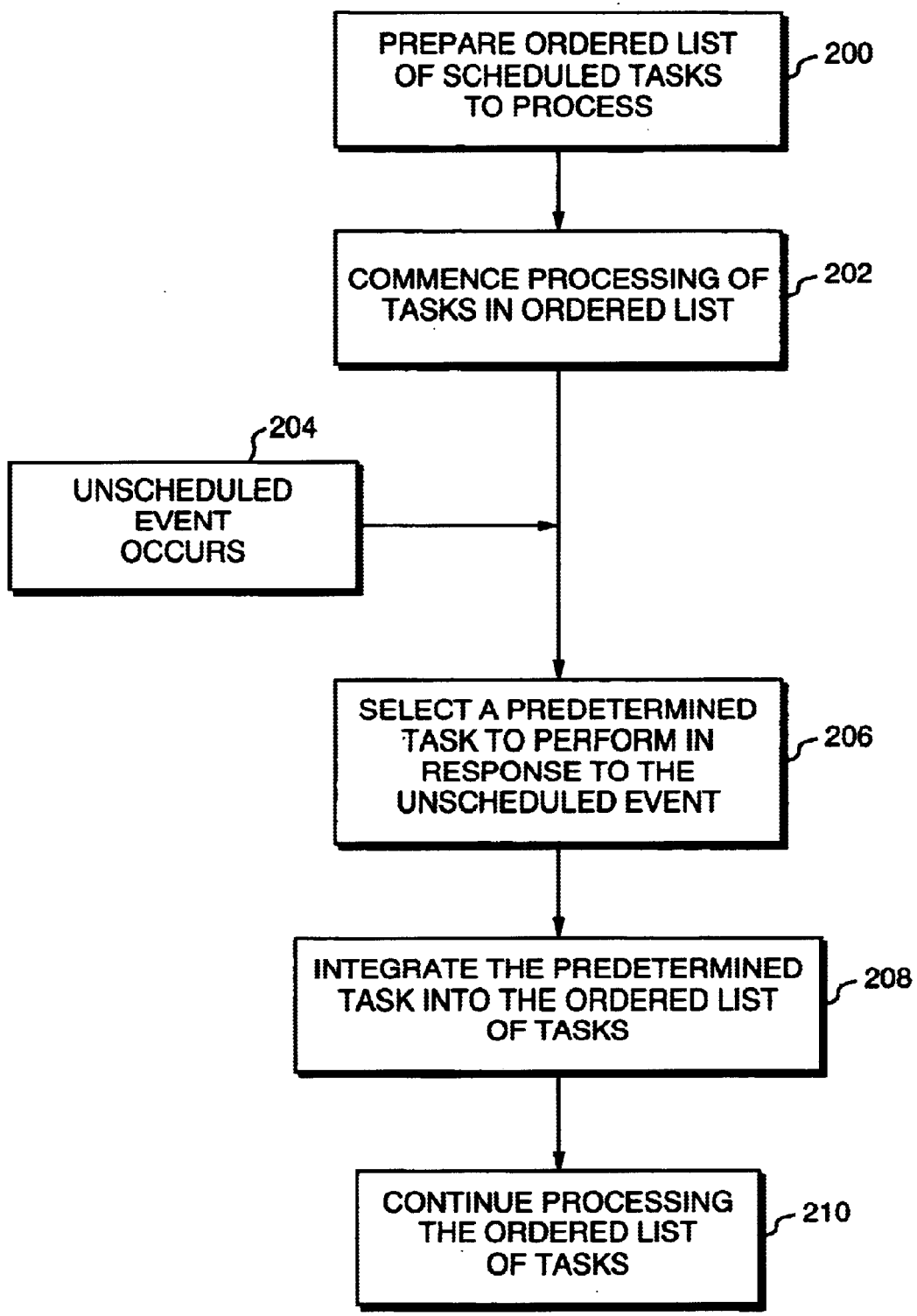
FIG. 2 is a flow chart showing the steps performed by the method of present invention.

The method employed by the present invention comprises first preparing an ordered list of scheduled tasks to be performed, step 200 FIG. 2. Once the scheduled tasks are contained in the ordered list, the processing system or device commences processing the tasks, step 202.

At some point during processing of the tasks, one or more unscheduled events occur, step 204. This unscheduled event indicates that some as yet unscheduled task needs to be generated and performed 206. This unscheduled event task is a predetermined response to be performed when the unscheduled event occurs. Although the new task may not need to be performed immediately, the system does need to schedule the new task resulting from the unscheduled event. The system then integrates the new task into the ordered list of tasks to perform, step 208. The system continues processing the tasks in the ordered list, and will process the newly scheduled task at a time in the future when that task is reached by the task processing system.

One example of this unscheduled event processing is a production scheduling system for a bottling plant. The bottling line can fill and seal several different types of bottles and products during the day. A bottling run requires setup time, run time and break down time. The production scheduling system is responsible for scheduling and monitoring the bottling runs, and schedules each bottling run into the main schedule at the start of the day, step 200.

As the bottling line is running, step 202, the scheduling system is receiving information through monitors and sensors located on machinery on the bottling line. One sensor reports that a number of filled bottles are being rejected for cracks and breakage. The number of cracked bottles is too low to stop the production run, but the scheduling system notes the event, step 204. The scheduling system can then determine to have a maintenance person examine the filling machinery to try to discover why more bottles than normal are cracking, step 206. The maintenance person will not examine the machines immediately, but will wait for a time period in between production runs when the bottling line is not running. The scheduling system then enters time for the maintenance person to examine the machinery into the main schedule step 208. The production line continues to run, with the new main schedule, step 210.

The method of the present invention can be advantageously and preferably utilized by a telephony call center management system performing inbound and outbound call campaigns. Such a telephone call center is available from Davox Corporation, Westford, Mass. as the Unison® System. Such a system is also described in co-pending U.S. patent application Ser. No. 08/252,121 incorporated herein by reference.

Figure 3:
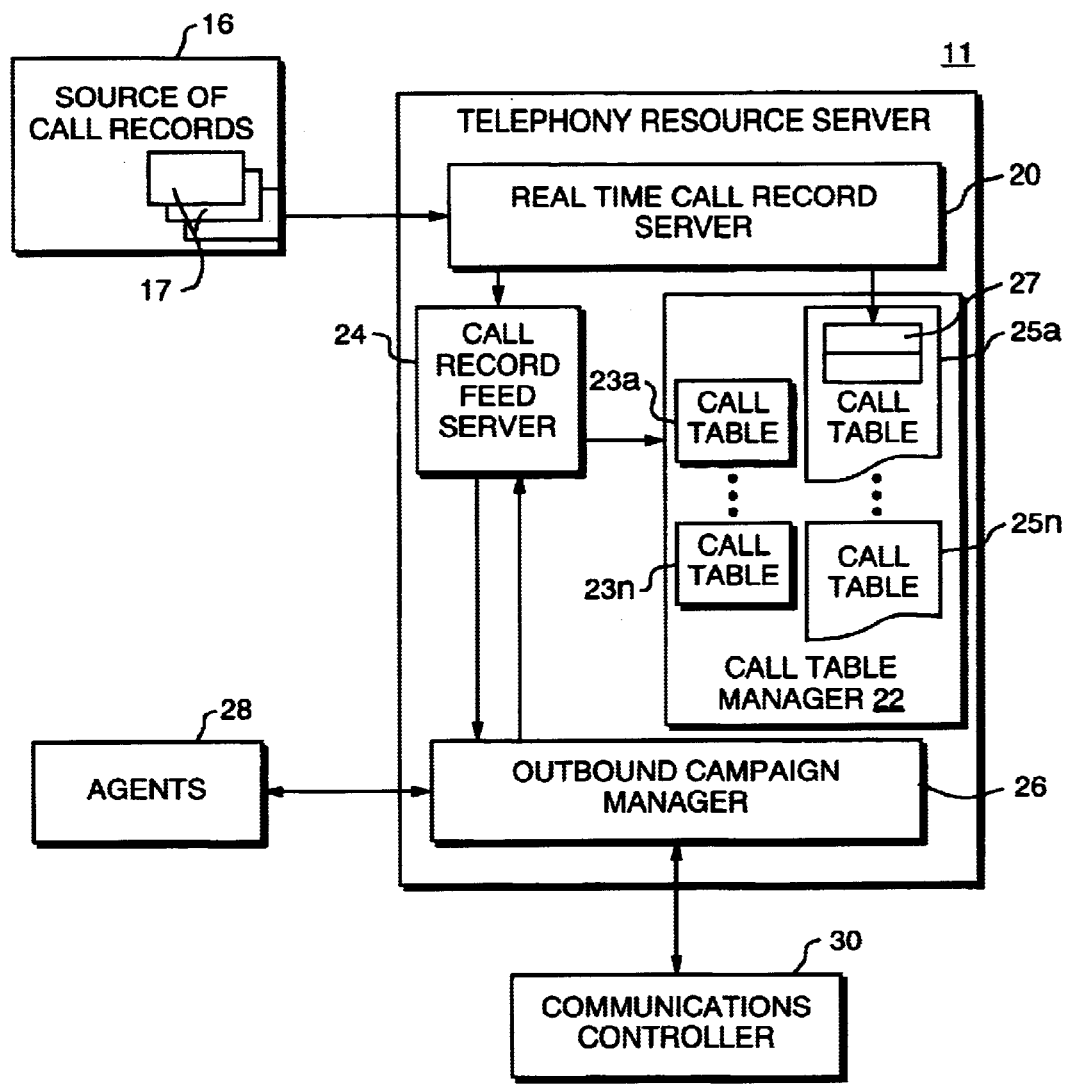
FIG. 3 is a schematic block diagram of a telephony system incorporating the present invention which can process unscheduled call records.

Previously, a telephony resource server 11 FIG. 3 received multiple or single call records 17 in one batch from a host or external record source 16. The batch downloading of call records 17 is performed early in the morning, before the call center commences operation for the day. Such call records are presorted into call campaigns and loaded into one or more call table(s) 23 in call table manager 22. As the call campaigns get underway, outbound campaign manager 26 will request a number of call records from call record feed server 24. Call record feed server 24 then downloads the requested number of call records from call tables 23. Outbound campaign manager 26 then commences processing of the call records by agents 28 and communications controller 30.

The concept of real time downloading according to the present invention can be integrated into the previously described telephone call campaign system. For a real time download, the source of call records 16, such as a computer system, will "trickle" or provide new call records 17 whenever the new call records 17 become available. Call records can also be obtained from other sources that can connect to telephony resource server 11 through any standard connection means including TCP/IP or other socket protocols.

For example, if the source of call records 16 is a host computer which gets updated with new information, call records can change or new call records can be created. These changed or created call records will then be downloaded in real time.

Source of call records 16 provides records into a real time call record server 20, which is part of telephony resource server 11. Real time call record server 20 is responsible for handling such call records 17 as they arrive from external record source 16. Real time call record server 20 places the call records in a call table 25a located in call table manager 22.

Call table manager 22, according to the present invention, now includes two types of call tables. Call records that are downloaded in batch mode are stored in a fixed length call table 23, since the number of call records being downloaded can be predetermined.

For real time downloading, one or more variable-length real time call tables 25 are created. Real time call table 25 can have call records added at any time during processing. For example, a new call record is inserted into position 27 of real time call table 25a. Real time call table 25 can dynamically increase in length as necessary to hold arriving call records.

Real time call record server 20 also informs call record feed server 24 that one or more new call records have arrived. Call record feed server 24 is responsible for managing and accessing call records 23, in real time call record tables 25 in call table manager 22, and for supplying the call records to outbound campaign manager 26 for processing.

Outbound campaign 26 manager is not aware of any difference between call records received during batch download as previously described, and call records received in real time. Outbound campaign manager 26 simply requests one or more call records from call record feed server 24. For batch downloaded call records, this request is straightforward in that call record feed server 24 obtains the requested number of call records from a fixed length call table 23.

If outbound campaign manager 26 requests more call records than available in fixed length call table 23, call record feed server 24 obtains all the call records available, and requests call table manager 22 to remove the empty fixed length call table 23. Call record feed server 24 then sends the call records to outbound campaign manager 26, and informs outbound campaign manager 26 that no more call records are available. Thus outbound campaign manager 26 knows that once the received call records are processed, the call campaign associated with those call records has completed.

Real time call records can arrive asynchronously compared to outbound campaign manager's 26 requests for call records. For example, outbound campaign manager 26 might request thirty call records for a call campaign that processes real time call records. Real time call table 25a might only contain ten call records 27. If call record feed server 24 supplies those ten call records and then informs outbound campaign manager 26 that no more call records are available, outbound campaign manager 26 would end the call campaign. Then when new real time call records are available in real time call table 25a, these new call records will not be processed.

Instead, since call record feed server 24 knows that outbound campaign manager 26 has requested call records from a real time call record table 25, and call record feed server 24 should not inform outbound campaign manager 26 that there are no more call records. In the above example, call record fez server 24 will supply the ten call records to outbound campaign manager 26, and leave the request for thirty call records by the outbound campaign manager 26 outstanding.

As new real time call records 17 arrive from source of call records 16 and are placed in slot(s) 27 in real time call record table 25 by real time call record server 20, call record feed server 24 will immediately send those call records to outbound campaign manager 26. Thus real time call records will be processed on demand as they are downloaded from source of call records 16. Once call record feed server 24 has sent the total requested call records to outbound campaign manager 26, call record feed server 24 will send no more call records until outbound campaign manager 26 issues another call record request.

Figure 4A:
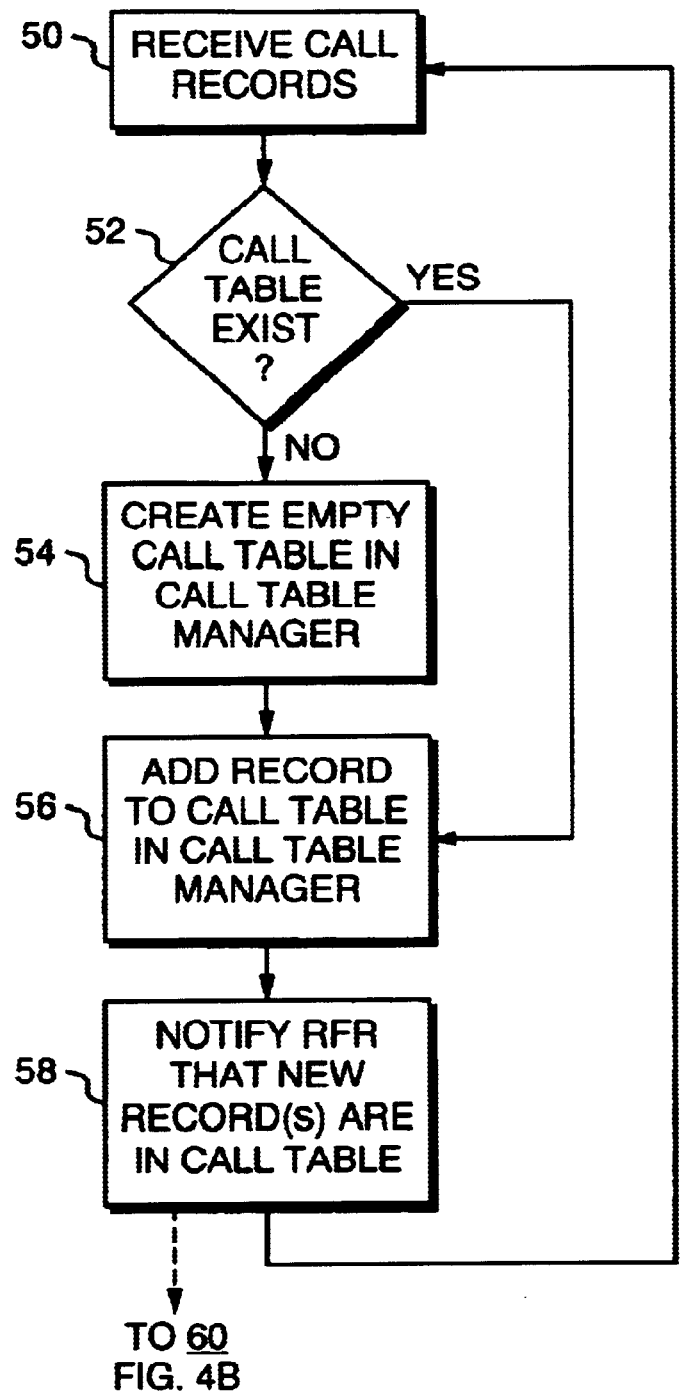
FIG. 4 is a more detailed flow chart showing a preferred embodiment of the method of the present invention.
Figure 4B:
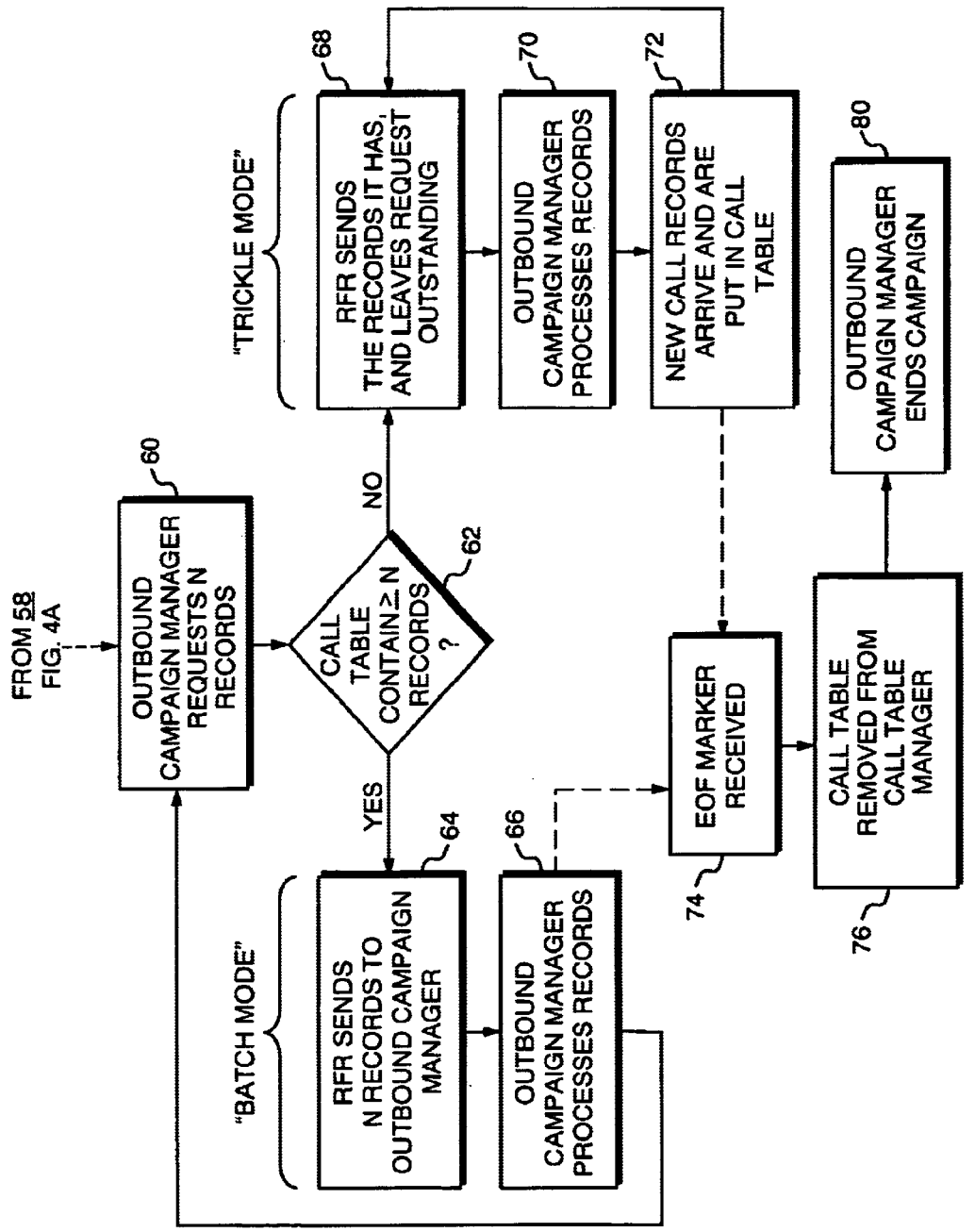

The steps performed in applying the present method to real time downloading of telephone call records commences when real time call record server 20 receives call records, step 50, FIG. 4. Real time call record server 20 checks call table manager 22 for the presence of a real time call table 25 to hold the real time call records being processed, step 52. In the preferred embodiment, each call campaign will have associated with it a separate fixed and real time call table 23, 25 respectively. The first time real time record server 20 receives of call record, an empty real time call table 25a is created in call table manager 22.

Alternatively, a real time call table 25 is created and inserted into call table manager 22 as a place holder for data. Real time call records will not be processed until call records are actually downloaded, but the initially empty real time call table 25 allows the telephony resource server 11 to be prepared to process such call records when the call records do arrive. In the preferred embodiment, the user of a telephony call center can preprogram an empty real time call table 25 to be inserted into call tables manager 22. This preprogramming includes a description of how to interpret call records 17 that arrive from external record source 16, and the steps for processing such call records.

If a real time call table 25 exists in call table manager 22 to handle a new call record 17, record feed server 20 inserts the real time call record 17 into the call table 25, step 56, FIG. 4. Real time call record server 20 then informs call record feed server 24 that at least one new call record is in a real time call table 25 in call table manager 22, step 58.

Outbound campaign manager 26 operates asynchronously from the insertion of call records into real time call record tables 25. Outbound campaign manager 26 simply requests "N" number of call records from call record feed server 24, step 60. Whether real time call record table 25 contains N records will determine how the call records are processed, step 62.

If real time call record table 25 contains N or more call records 17, step 62, call record feed server 24 will send N records to outbound campaign manager 26, step 64. Outbound campaign manager 26 will process the call records as part of the call campaign, step 66. Depending on the pacing of the call campaign, outbound campaign manager 26 will later issue another request for call records, step 60. This loop of steps 60–66 resembles "batch mode", where call records are requested and processed in groups.

If real time call record table 25 contains less than N call records, call record feed server 24 will send all the call records available, step 68, to outbound campaign manager 26 to be processed, step 70. Call record feed server 24 will then leave the request outstanding. When new call records 17 are received, the call records will immediately be sent to outbound campaign manager 26, step 72. Thus, call records "trickle" into outbound campaign manager 26 in real time, as they occur, to be immediately processed.

A user can configure a telephone call campaign to utilize either of these modes, depending on the preferences for the call campaign. For example, if a user wants received call records to be immediately processed, the user can instruct the outbound campaign manager 26 to request a large number of call records, thereby causing any call records in real time call record table 25 to be immediately sent to outbound campaign manager 26, and any subsequent real time call records received will be immediately processed.

An example of using this so called "trickle mode" is a telephony call center running several inbound and outbound call campaigns. An inbound call is received from a party requesting specific information that is not readily available. The best way to handle the call is have an agent 28 call the party back when the requested information is available.

When the information is available, the external record source 16 will download the information into a real time call record table 25. Since outbound campaign manager 26 has an outstanding request for call records in real time call record table 25, call record feed server 24 sends the call record 17 to outbound campaign manager 26. Outbound campaign manager 26 then processes the call record by contacting the party using communications server 30 to obtain a trunk line and dial the call, and once the party has been contacted, providing agent 28 with the requested information to relay to the called path. Accordingly, the processing of the call and request for information is fully automated, requiring no special actions by agents or system users.

Alternatively, if a user has several other important call campaigns running, the user can instruct the outbound campaign manager 26 to request only a few real time call records at a time from call record feed server 24. As real time call records are received and placed in real time call record table 25, the call records are only sent to outbound campaign manager 26 to be processed in small increments. Therefore outbound campaign manager 26 can devote more processing time to call records for other call campaigns.

In the preferred embodiment, outbound campaign manager 26 can switch between "batch mode" and "trickle mode" to appropriately fit the requirements of one or more call campaigns. For example, if a large number of call records are initially available, outbound campaign manager 26 begins by "batch mode", processing several call records at a until there are no more real time call records in call table 25a. Occasionally, more call records 17 will be downloaded from record source 16. At this point, outbound campaign manager 26 "switches" to "trickle" or "on demand" mode so as to process the single call records as they are received from external record source 16. Therefore, outbound campaign manager 26 can catch up by processing many real time call records in "batch mode" until some time when it would be more expedient to process single records as they arrived.

In an alternative method, outbound campaign manager 26 may be processing real time call records "on demand" as the call records are downloaded. The processing of such call records a few at a time is slowing down the other call campaigns that outbound campaign manager 26 is also running. In such a case, the user can instruct outbound campaign manager to switch to processing call records in batch mode, allowing several real time call records to collect in a real time call table 25 before bound campaign manager 26 requests and processes such call records in batch mode.

As call campaigns progress, a point may be reached where no more unscheduled events will occur. If record source 16 can readily determine that no more real-time call records will be downloaded, record source 16 can send a termination signal, step 74 FIG. 4, which informs real time call record server 20 that the corresponding real time call table 25 in call table manager 22 can be removed. Real time call record server 20 will inform call record feed server 24 that no more such call records will be down loaded.

If real time call table 25 is empty, call record feed server 24 will remove real time call table 25 from call table manager 22, step 76. Otherwise call table 25 will be removed when all call records contained therein have been requested by outbound campaign manager 26. Call record feed server 24 also informs outbound campaign manager 26 that no more call records are available, and outbound campaign manager 26 can terminate the call campaign when all the call records are processed.

Accordingly, the present invention allows the processing of scheduled tasks in situations where unexpected or unscheduled events occur that require changes in the task schedule. This allows the systems to be more responsive to real-time demands and changes, while still maintaining the efficiency of predetermined task scheduling.

Modifications and substitutions by one of ordinary skill in the art are considered to be within the scope of the present invention which is not to be limited except by the claims which follow.

What is claimed is:

1. A method of processing events in a data processing system, said method comprising the acts of:
   providing a predetermined ordered list of scheduled tasks to be performed;
   user defining at least one unscheduled event;
   automatically detecting the occurrence of at least one of said user defined unscheduled events;
   automatically generating at least one unscheduled task in response to the detected occurrence of said at least one unscheduled event; and
   electronically integrating said at least one unscheduled task into said predetermined ordered list of scheduled tasks to be performed.

2. The method according to claim 1, wherein said data processing system includes a telephony system.

3. The method according to claim 2, wherein at least one of said scheduled tasks includes processing outbound calls.

4. The method according to claim 3, wherein said at least one unscheduled task includes processing out bound calls.

5. A task processing system comprising:
   a table manager for controlling at least one fixed length table and at least one variable length table, each said tables including at least one ordered list of scheduled tasks to be processed;
   a task processor responsive to said both at least one fixed length and said variable length tables, for processing said tasks according to a predetermined order;
   means for receiving at least one user defined unscheduled event;
   means for detecting the occurrence of at least one of said user defined unscheduled events;
   a first record server, coupled to said task processor and responsive to said at least one fixed length and said at least one variable length tables, for retrieving tasks from said at least one fixed length and said at least one variable length tables and for providing said retrieved tasks to said task processor;
   means for generating unscheduled tasks in response to the detection of the occurrence of at least one of said user defined unscheduled event; and
   a real time record server, responsive to said generation means, for receiving at least one real time unscheduled task to be handled and for inserting, in real time, said at least one unscheduled task into said at least one variable length table.

6. The system according to claim 5, and wherein said task processing system includes a telephony system.

7. The system according to claims 6, wherein at least one scheduled task includes processing outbound calls.

8. A method of processing unscheduled events in a contact management system, said method comprising the acts of:
   user defining at least one unscheduled event, each said at least one unscheduled events having at least one associated unscheduled task;
   preparing an ordered contacts list having a plurality of sequentially ordered contacts to be contacted;
   responsive to said preparing act, automatically sequentially processing the contact list;
   automatically detecting an occurrence of at least one of said at least one user defined unscheduled events; and
   responsive to said act of automatically detecting, automatically integrating the unscheduled task associated with said detected at least one user defined unscheduled event into the ordered contact list having the plurality of contacts to be contacted.

9. The method according to claim 8, wherein the unscheduled task is processing out-bound telephone calls.

10. A telephone call center management system for processing a plurality of calls comprising:
    a task processor, for associating at least one task with an unscheduled event;
    a table manager, for ordering contacts in a call list in a predetermined order and for integrating tasks from a user defined unscheduled event into the call list;
    a call list processor, for automatically processing a plurality of outbound calls to the contacts listed in the call list in the predetermined order;
    an unscheduled event detecting device, responsive to said plurality of outbound calls, for detecting an occurrence of at least one user defined unscheduled event; and
    a real time server, responsive to said detecting device and coupled to the task processor, for responding to said detection, for receiving the at least one task associated with the user defined unscheduled event from the task processor and for providing the at least one task to the table manager for integration into the call list.

11. The system according to claim 10, wherein the at least one of said unscheduled tasks includes processing outbound calls.

12. The system according to claim 10, further including a signal device for sending a signal to the detecting device.

13. The system according to claim 12, wherein the signal is an occurrence of an event.

14. The system according to claim 12, wherein the signal is a predetermined criterion.

* * * * *

UNITED STATES PATENT AND TRADEMARK OFFICE
CERTIFICATE OF CORRECTION

PATENT NO. : 6,721,778 B1
DATED : April 13, 2004
INVENTOR(S) : Smith et al.

It is certified that error appears in the above-identified patent and that said Letters Patent is hereby corrected as shown below:

<u>Title page,</u>
Item [73], Assignee, should read -- Concerto Software, Inc., Westford, MA --

Signed and Sealed this

Eighth Day of February, 2005

JON W. DUDAS
*Director of the United States Patent and Trademark Office*